United States Patent
Richter et al.

[11] Patent Number: 5,913,555
[45] Date of Patent: Jun. 22, 1999

[54] METHODS OF REPAIRING WORN BLADE TIPS OF COMPRESSOR AND TURBINE BLADES

[75] Inventors: Karl-Hermann Richter, Indersdorf; Ulrich Knott, Munich, both of Germany

[73] Assignee: MTU Motoren- und Turbinen-Union Muenchen GmbH, Munich, Germany

[21] Appl. No.: 08/950,869

[22] Filed: Oct. 15, 1997

[30] Foreign Application Priority Data

Oct. 18, 1996 [DE] Germany .......................... 196 42 980

[51] Int. Cl.⁶ ........................................ B23P 15/00
[52] U.S. Cl. .................. 29/889.1; 29/402.08; 29/402.19; 29/402.13
[58] Field of Search ................ 29/889.1, 402.07, 29/402.08, 402.13, 402.16, 402.19; 228/119

[56] References Cited

U.S. PATENT DOCUMENTS

| | | | |
|---|---|---|---|
| 5,479,704 | 1/1996 | Richter et al. | 29/889.1 |
| 5,522,134 | 6/1996 | Rowe et al. | 29/889.1 |
| 5,697,151 | 12/1997 | Werner et al. | 29/889.1 |
| 5,755,031 | 5/1998 | Baumgarten et al. | 29/889.1 |
| 5,758,416 | 6/1998 | Reverman et al. | 29/889.1 |

FOREIGN PATENT DOCUMENTS

| | | |
|---|---|---|
| 4014808 | 11/1990 | Germany . |
| 4327189 | 2/1995 | Germany . |

OTHER PUBLICATIONS

W. Storch, G. Mossakowski, J. Mehlhorn, F. Schwenke, Instandhaltung von Dampfturbinen–Endstufenschaufeln, BWK Bd. 45 (1993) No. 5 –May, pp. 240 to 246.

Claus Bremer, Kompressor–und Turbinenschaufeln automatisch reparieren, Werkstatt und Betrieb, 129 (1996) 7–8, pp. 672 to 674.

E. Meyer, K. Reinecken, Reparatur von Strahltriebwerksteilen durch Elektronenstrahlschweissen, Werkstatt und Betrieb, 114 (1981) 7, pp. 439 to 440.

W. Storch, U. Wendler, F. Schwenke, St. Keitel, H. Ehrhard, Elektronenstrahlschweissen bei der Rekonstruktion von Turbinenschaufeln, Maschinenbautechnik, Berlin, 40 (1991) 4, pp. 183 to 187.

*Primary Examiner*—Irene Cuda
*Attorney, Agent, or Firm*—W. F. Fasse; W. G. Fasse

[57] ABSTRACT

In a method of repairing worn blade tips of compressor or turbine blades, the worn blade tip (4) is first removed from the remaining blade portion (2) at a standardized height (h). The actual geometry of the end of the remaining blade portion (2) at the height (h) is measured, for example by optical digital image processing means. A repair part (4') is cut from a plate or sheet of repair material having a thickness (d) essentially corresponding to the difference between the nominal finished height (H) of the repaired turbine blade (1) and the standardized height (h) of the remaining blade portion (2) undergoing repair. The repair part (4') is cut to have a contour corresponding to the measured actual geometry of the end of the remaining blade portion (2) at the standardized cut-off height (h), for example using a laser cutting process CNC-controlled by the acquired data representing the actual blade geometry. Finally, the repair part (4') is attached to the end of the remaining blade portion (2), for example by welding or soldering, and preferably by induction soldering with a solder foil (5) interposed between the repair part (4') and the remaining blade portion. The resulting repair is a smooth transition from the remaining blade portion to the repair part, substantially matching the original new blade shape, without requiring finish machining of the joint.

27 Claims, 3 Drawing Sheets

5,913,555

METHODS OF REPAIRING WORN BLADE TIPS OF COMPRESSOR AND TURBINE BLADES

FIELD OF THE INVENTION

The invention relates to a method of repairing worn blade tips of the blades of rotary machines such as compressors and turbines, for example turbine jet engines.

BACKGROUND INFORMATION

The blades of turbine machines, such as the compressor and turbine blades of jet engines, are subject to erosive wear, especially at the area of the blade tips. In the past, it has then been necessary to completely replace the entirety of the worn turbine blades. However, for cost reasons, a method of repairing only the worn blade tips, instead of completely replacing the entire worn blades, is needed. Heretofore, worn blade tips have been repaired by machining down the worn tips to remove the respective worn blade portion, and then re-applying the missing material, for example, by means of microplasma deposit welding. The published article "Instandhaltung von Dampfturbinen-Endstufenschaufeln" ("Repair of Steam Turbine End Stage Blades") by W. Storch et al. in BWK, Vol. 45, No. 5 (May 1993), pages 240 to 246, and particularly page 242, describes such a known repair method. A disadvantage of such a known method is the relatively high effort required for carrying out mechanical after-machining or finish-machining, which becomes ever greater as the width of the weld bead of the applied material increases.

SUMMARY OF THE INVENTION

In view of the above it is the aim of the invention to provide an improved and simplified method of repairing worn turbine blades that can be carried out with a minimum of working steps and a minimum of working effort. Further objects of the invention are to avoid or overcome the disadvantages of the prior art and to achieve additional advantages, as apparent from the present description.

The above objects have been achieved in a method for repairing worn turbine blades according to the invention, including the following steps:

a) removing a worn blade tip portion of the blade so that the remaining portion or stump of the blade has a length or height corresponding to a standardized height h;

b) measuring the actual geometry of the end of the remaining portion of the blade at the height h;

c) forming a repair profile or repair part of a repair material having a thickness d substantially corresponding to the difference between the desired nominal length or height H of the finished repaired turbine blade and the standardized height h of the remaining portion of the blade (d≈H−h, where any deviation from exact equivalence is to allow for usual manufacturing tolerances and the possible use of an interposed solder foil or the like as described below), and having a contour corresponding to the above mentioned actual geometry of the end of the remaining portion of the blade; and d) arranging and attaching the repair profile on the remaining portion of the blade.

The method of the invention is especially advantageously adapted for repairing compressor and turbine blades of jet engines.

An advantage of the method according to the invention is that the worn turbine blades can be precisely renewed in a standardized or uniform manner, so that for the repair of a larger number of such blades, all of these blades can be renewed in the same manner. A further advantage of the method according to the invention is that the required individual method steps can be considerably standardized, and thus the overall method can be rationalized and made more economical, due to the performance of the same uniform repair steps for all blades of a turbine or compressor that are to be repaired or renewed. In other words, the invention avoids the need to carry out specialized or individualized repair steps, using individualized or specialized repair jigs and tool set-ups, that are individually adapted for each respective blade that is to be repaired.

According to the invention, the removal of the worn blade tip portion can be carried out by chip-removing machining operations, or most preferably by a laser beam cutting operation. The repair profile that is to be arranged on the stump or remaining portion of the blade being repaired is preferably produced by appropriately cutting the repair profile from a metal sheet or plate having the required thickness d, whereby the cutting of this metal sheet or plate may advantageously be carried out by laser beam cutting.

Advantageously, the step of measuring the actual geometry of the cut end of the stump or remaining portion of the blade is carried out by optical recognition and image processing, for example, by automatic means including a camera or other imaging device that may be a digital device, and an image processing computer. Further, according to a particular embodiment of the invention, the image data representing the above mentioned actual geometry is transferred to a computer numerical control (CNC) laser cutting program for numerically controlling the laser beam cutting operation for producing the repair profile.

The repair profile may be attached or mounted on the remaining portion of the blade by means of welding, and especially advantageously by means of induction welding. Alternatively, and preferably, the repair profile may be attached to the remaining blade portion by means of soldering, which may be furnace or oven soldering, or advantageously may be induction soldering. In a particularly advantageous embodiment of the invention, the repair profile is attached to the remaining blade portion by soldering using a solder material in the form of a solder foil having a thickness Δ interposed between the repair profile and the remaining blade portion. This thickness Δ of the solder foil is taken into account in dimensioning the thickness d of the sheet or plate for the repair profile, such that d=H−h−Δ.

Advantageously, the solder foil is cut to have a contour corresponding to the profile of the remaining portion of the blade and thus also corresponding to the profile of the repair part. The solder foil is advantageously cut by means of laser beam cutting.

It is further advantageous if the soldering operation is carried out using a pre-specified, defined contact pressure of the components being pressed together.

If required for achieving the desired surface finish, the inventive method may further include a step of finish machining the weld seam or solder seam after securing the repair profile on the remaining portion or stump of the blade. Preferably however, the inventive method achieves a precise, flush or smooth transition between the remaining portion of the blade and the repair part, and thus avoids the need of any finish machining.

According to a further aspect of the invention, the cutting of the sheet or plate for making the repair profile is carried out using a two-dimensional cutting guidance with a cut angle that is maintained at 90° relative to the local surface of the sheet or plate. In this manner, the invention provides the advantage that cutting of the sheet or plate can be carried out with a very minimal effort, using relatively simple and inexpensive cutting equipment.

According to another, alternative aspect of the invention, the cutting of the sheet or plate for producing the repair part is carried out using a three-dimensional cutting guidance with a local cutting angle that is continuously adjusted as needed at each point along the contour of the repair profile to match or adapt to the respective contour angle or shape trend or curve of the profile of the remaining blade portion at the height h. While such a method of cutting the sheet or plate is more complicated, it achieves the advantage that the geometry of the repair profile is exactly matched to the geometry of the blade in the area of its tip, so that the blades may be repaired or renewed to have practically an identical three-dimensional profile configuration as their brand-new or like-new condition.

In any event, cutting of the repair profile is preferably carried out in such a manner that the cutting gap width is compensated for or taken into account.

BRIEF DESCRIPTION OF THE DRAWINGS

In order that the invention may be clearly understood, it will now be described in connection with example embodiments of the invention, with reference to the drawings, wherein.

DETAILED DESCRIPTION OF PREFERRED EXAMPLE EMBODIMENTS AND OF THE BEST MODE OF THE INVENTION

Figure 1:
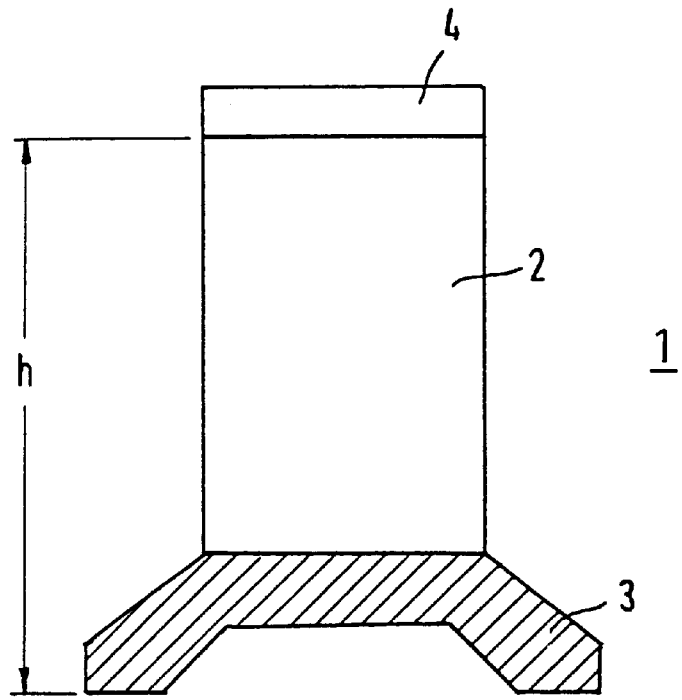
FIG. 1 is a greatly simplified schematic side view of a turbine blade which is to be repaired according to an example embodiment of the invention.

As shown in a greatly simplified schematic form in FIG. 1, a worn turbine blade 1 includes a worn blade tip portion 4, a stump or remaining blade portion 2 that is not worn or not seriously worn, and a root or insert portion 3 for securing the turbine blade onto a rotor of a turbine jet engine, for example. Up to the height h measured from the base of the root portion 3, the blade, and particularly the remaining blade portion 2, is not seriously worn and is thus still useable, while the blade tip portion 4 requires repair or renewal due to wear.

Repair or renewal of the worn blade tip portion 4 is carried out in the following manner. First, the worn blade tip portion 4 is cut off or otherwise removed at the height h from the remaining blade portion 2. This height h is specified as a standardized height so that in the repair of several turbine blades of the same turbine or compressor, all of these blades will be cut off at the same height h. Thus, the height h may be specified based on an inspection of all of the worn blades 1 that are to be repaired and choosing the proper value of the height h so that even the largest damaged tip portion 4 among all the blades 1 will be removed. Alternatively, a pre-specified standardized height h may be used, based on empirical data or knowledge regarding the wear characteristics of the blades of a particular turbine machine after a particular duration of operation.

The removal of the worn blade tip portion 4 can be carried out by any known method of machining and particularly chip removing machining of the blade 1, or preferably by cutting off the blade 1 at the height h, and most preferably by carrying out such cutting as laser beam cutting. The details of carrying out such laser beam cutting of the blade 1 along the height h will be understood by persons of ordinary skill in the art.

Figure 2:
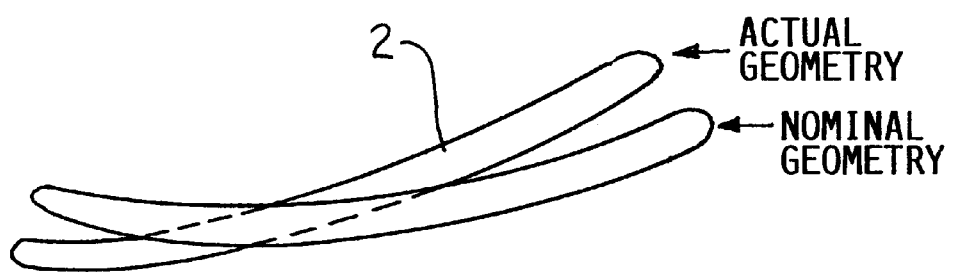
FIG. 2 are representative sectional views of the nominal or desired geometry and the actual geometry, in greatly exaggerated form, of the turbine blade at the height h at which the worn blade tip has been cut off.

FIG. 2 shows a cross-section through the turbine blade 1 at the height h, namely an end view of the stub or remaining portion 2 of the blade 1 after the tip portion 4 has been cut off at the height h. As shown in FIG. 2 in a greatly exaggerated manner for the sake of clarity, the existing actual geometry of the cross-section of the turbine blade 1 at the height h might deviate from the desired or nominal geometry. In addition to positional deviations, which do not play any significant role in the present renewal or repair of the blade tip, shape or form deviations may also arise, which must be taken into account in the present repair process for renewing the worn blade tips. The actual geometry is compared to the nominal geometry, and the present repair process is continued if any deviation between the actual geometry and the desired or nominal geometry is within a prescribed tolerance range. However, if the actual geometry deviates from the nominal geometry in excess of the tolerance range, then the particular turbine blade will be repaired to a greater extent by a different method or will be completely replaced.

Figure 5:
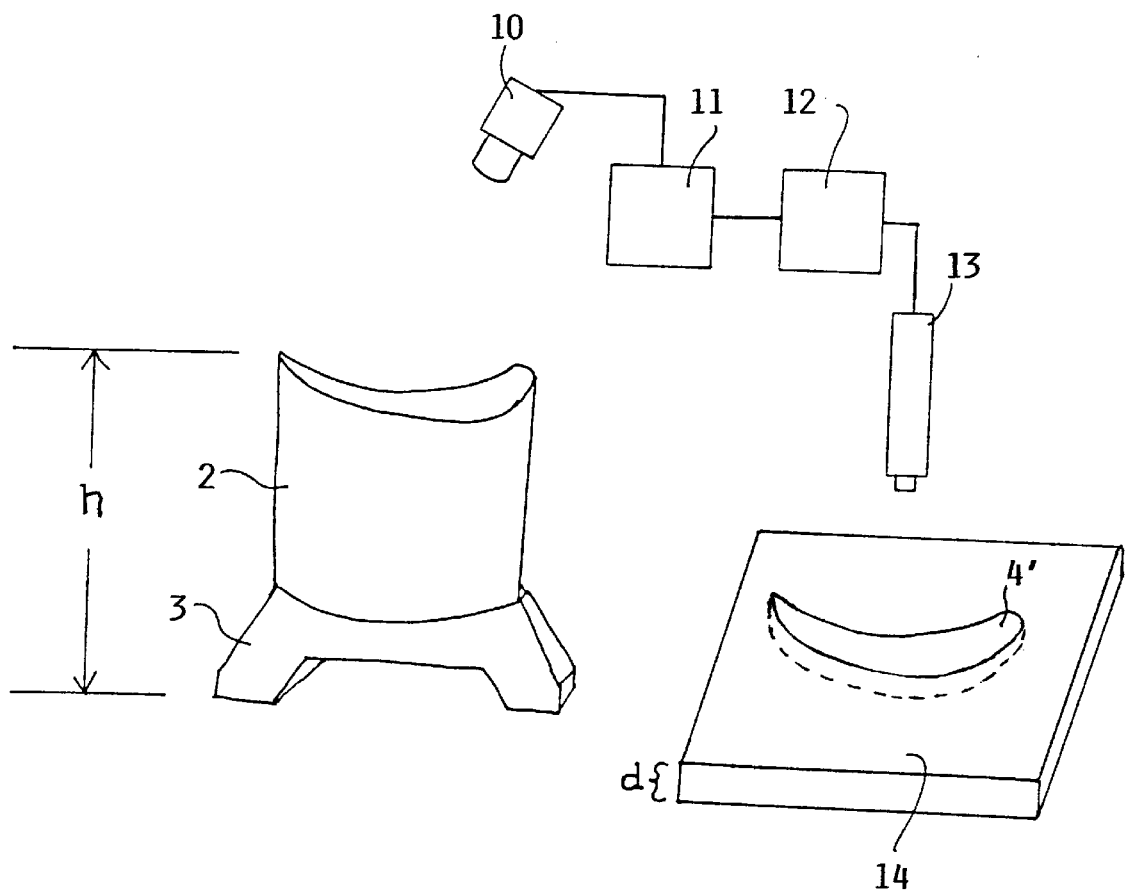
FIG. 5 is a greatly simplified schematic diagram of the equipment used for image processing and numerically controlled laser beam cutting in steps of the inventive method.

In order to carry out the above geometry evaluation, the existing actual geometry of the end of the remaining blade portion 2 at the standardized height h is measured, preferably by means of an image processing technique, by which the actual geometry is numerically detected and analyzed, and the resulting data are used for the numeric control of the subsequent processing steps. For example as shown in FIG. 5, a camera such as a digital camera 10 captures the image of the end of the remaining blade portion 2 at the height h and provides data corresponding thereto to an image processing computer 11. The computer analyzes and processes the image data, while also comparing it to stored nominal geometry data, and provides a corresponding output to a CNC-control unit 12, which accordingly controls a laser beam cutting apparatus 13 as will be described below.

As a next step in the present method, a repair profile or repair part 4' is cut out of a suitable repair material so as to have a shape or contour exactly matching that of the blade tip portion 4. The repair material is in the form of a sheet or plate having a proper thickness d so that the total height of the blade after being repaired will correspond to a desired nominal height H. Namely, the thickness d of the sheet or plate essentially corresponds to the difference between the nominal height H of the finished or repaired blade 1 and the standardized height h of the stump or remaining blade portion 2. Furthermore, this sheet or plate is cut in such a manner that the contour of the resulting repair profile 4' matches or corresponds to the actual geometry existing at the end of the remaining blade portion 2 at the standardized height h. In order to achieve this, the cutting operation is controlled using the data acquired during the measurement of the actual geometry of the end of the remaining blade portion 2. More specifically as shown in FIG. 5, cutting of the contour of the repair profile 4' from the sheet 14 of repair material is preferably carried out using a computer numerical control (CNC) 12 driven laser cutting apparatus 13 that is numerically controlled using the data acquired during the measurement of the actual blade geometry.

Cutting of the sheet or plate 14 for producing the repair profile 4' can be carried out using either a two-dimensional cut guidance or a three-dimensional cut guidance. For the two-dimensional cut guidance, a constant cutting angle of 90° is maintained between the resulting cut edge and the surface of the sheet or plate. On the other hand, using the three-dimensional cut guidance, the cutting angle is continuously adjusted as needed at each point along the contour of the repair profile 4', so that the cutting angle selected at each point along the contour corresponds to the local surface direction or angle of the profile of the remaining blade portion 2 at the height h. In this manner, not only is the contour of the cross-section of the repair profile 4' matched to the cross-sectional contour at the end of the remaining blade portion 2, but also the overall surface shape or extension of the blade profile is smoothly maintained from the remaining blade portion 2 to and along the repair profile 4'. In any event, the cutting of the repair profile 4' is carried out so as to compensate for or take into account the width of the cutting gap. In other words, the cutting line is offset as necessary so that the finished cut edge is at the desired dimensional location and has the desired contour.

Figure 3:
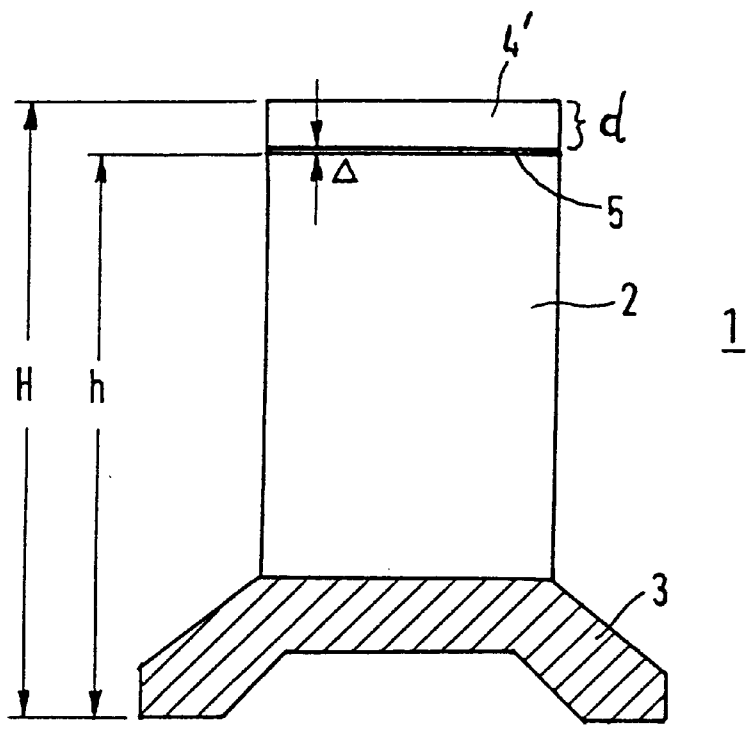
FIG. 3 shows a greatly simplified schematic side view, generally corresponding to FIG. 1, showing a turbine blade of which the worn blade tip has been repaired or renewed according to the method of the invention.

Next, the repair profile 4' is exactly positioned and oriented such that the contours thereof properly match the contours of the end of the remaining blade portion 2, the repair profile 4' is placed on the end of the remaining blade portion 2 in this proper position and orientation, and finally connected thereto. To achieve this, the repair profile 4' may be held in position in any known manner and may then be connected by means of welding or soldering as desired. In the case of welding, the most preferred method is induction welding. However, preferably the connection is achieved by soldering, which may be carried out as furnace soldering or induction soldering. Preferably, the soldering is carried out using solder in the form of a solder foil 5 having a specified thickness $\Delta$ as shown in FIG. 3. The thickness $\Delta$ of the solder foil together with the thickness d of the sheet or plate used for making the repair profile 4' are respectively to be dimensioned in such a manner that the finished repaired blade 1 will have the total height H as desired. Namely, the standardized height h of the remaining blade portion 2 together with the thickness d of the repair profile 4' plus the thickness $\Delta$ of the solder foil 5 should result in the nominal height H of the blade 1 after its repair, i.e. $d=H-h-\Delta$.

Advantageously, before carrying out the soldering process, the solder foil 5 is cut to shape with such a contour as will match the contour of the remaining portion 2 at the height h and thus also match the contour of the repair profile 4'. Preferably, the solder foil 5 is cut by means of a laser beam cutting process, which is preferably once again controlled using the data acquired by measuring the actual geometry of the cross-section of the remaining blade portion 2 at the height h. This cutting can be carried out using the same laser cutting apparatus 13 as shown in FIG. 5.

Thereafter, the repair profile 4' is pressed with a defined contact pressure P (FIG. 4) against the end of the remaining blade portion 2, with the solder foil 5 sandwiched therebetween, and the soldering, i.e. heating, itself is then carried out under a protective gas environment or in a vacuum. If the solder material of the solder foil 5 is such that its thickness is reduced under the effects of the soldering and the contact pressure, then the above mentioned meaningful thickness $\Delta$ of the solder foil 5 should be understood as the thickness that results under the effect of the contact pressure and the soldering.

After the repair profile 4' has been connected or bonded onto the remaining blade portion 2, the weld or soldering seam location is after-machined or finished if necessary to provide a completely smooth, precise transition having the same desired contour shape as an original or new blade. Preferably, however, the repair profile 4' and the solder foil 5 are dimensioned and cut in such a manner and precisely enough so that an after-machining or finish machining of the soldering seam is not necessary.

Figure 4:
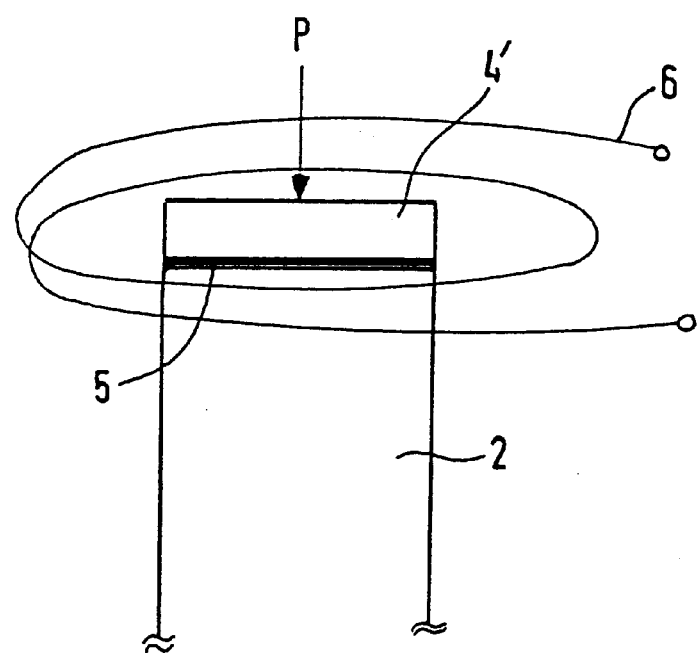
FIG. 4 is a greatly simplified schematic perspective view of an inductive soldering process that is used in connection with the inventive method for repairing the worn tip of a turbine blade.

FIG. 4 shows a greatly simplified schematic perspective view of an apparatus for carrying out the induction soldering for connecting the repair profile 4' onto the end of the remaining blade portion 2. In order to carry out the soldering, an induction coil 6 is arranged around the area of the joint between the two components, and the coil 6 is then powered by a high frequency current to generate an induction current in the components such that the end of the remaining blade portion 2 and the repair profile or part 4' as well as the solder foil 5 located therebetween are heated to a suitable temperature for carrying out the soldering process. After the soldering is completed, the high frequency power provided to the coil 6 is switched off, and the component is allowed to cool. During the soldering process and until the solder joint has cooled, the repair profile 4' is pressed against the end of the remaining blade portion 2 with a contact pressure P in the above described manner.

The method according to the invention is especially adapted and suitable for repairing or renewing worn blades, and especially worn blade tips, of the compressors and turbines of jet engines.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of repairing a worn blade of a rotary compressor or turbine so as to have a finished nominal blade height (H), comprising the following steps:

removing a worn tip portion of said blade to leave a remaining blade portion of said blade having a standardized height (h);

measuring an actual geometry of an end of said remaining blade portion at said standardized height (h);

forming a repair part of a repair material having a thickness (d) substantially corresponding to a difference between said finished nominal blade height (H) and said standardized height (h), and having a contour corresponding to said actual geometry of said end of said remaining blade portion; and arranging and attaching said repair part on said end of said remaining blade portion.

2. The method according to claim 1, wherein said step of removing said worn tip portion comprises mechanical chip-removing machining of said worn blade so as to remove said worn tip portion.

3. The method according to claim 1, wherein said step of removing said worn tip portion comprises laser beam cutting said worn blade so as to remove said worn tip portion.

4. The method according to claim 1, wherein said repair material comprises a sheet of said repair material having said thickness (d), and said step of forming said repair part comprises cutting said repair part from said sheet of said repair material.

5. The method according to claim 4, wherein said cutting of said repair part comprises two-dimensionally guided cutting with a fixed cutting angle of 90° between a sheet surface of said sheet and a cut edge along said contour of said repair part.

6. The method according to claim 4, wherein said cutting of said repair part comprises three-dimensionally guided cutting with a variable cutting angle that is adapted at every point along said contour of said repair part to match a local surface profile angle of said remaining blade portion at said standardized height (h) at each said point.

7. The method according to claim 4, wherein said cutting of said repair part is carried out so as to compensate for a width of a cutting gap formed by said cutting.

8. The method according to claim 4, wherein said step of cutting said repair part from said sheet of said repair material comprises laser beam cutting.

9. The method according to claim 1, wherein said step of measuring said actual geometry comprises acquiring and processing an optical image of said end of said remaining blade portion to provide actual geometry data.

10. The method according to claim 9, wherein said step of cutting said repair part from said sheet of said repair material comprises laser beam cutting, and further comprising providing said actual geometry data to a CNC program and geometrically controlling said laser beam cutting using said CNC program responsively to said actual geometry data.

11. The method according to claim 1, wherein said step of attaching said repair part comprises welding said repair part onto said end of said remaining blade portion.

12. The method according to claim 11, wherein said welding comprises induction welding.

13. The method according to claim 11, wherein said welding leaves a weld seam, and further comprising a subsequent step of finish machining said weld seam.

14. The method according to claim 1, wherein said step of attaching said repair part comprises soldering said repair part onto said end of said remaining blade portion.

15. The method according to claim 14, wherein said soldering comprises furnace soldering.

16. The method according to claim 14, wherein said soldering comprises induction soldering.

17. The method according to claim 14, wherein said soldering comprises interposing a foil of solder material having a foil thickness ($\Delta$) between said repair part and said end of said remaining blade portion, and wherein said thickness (d) of said repair part is dimensioned in consideration of said foil thickness such that said thickness (d) of said repair part equals said finished nominal blade height (H) minus said standardized height (h) and said foil thickness ($\Delta$).

18. The method according to claim 17, further comprising cutting said foil of solder material to have a contour corresponding to said actual geometry of said end of said remaining blade portion.

19. The method according to claim 18, wherein said cutting of said foil comprises laser beam cutting.

20. The method according to claim 17, further comprising applying a defined contact pressure to and between said repair part and said remaining blade portion with said foil of solder material therebetween.

21. The method according to claim 14, wherein said soldering leaves a solder seam, and further comprising a step of finish machining said solder seam.

22. The method according to claim 1, wherein said worn blade is a worn compressor or turbine blade of a jet engine.

23. The method according to claim 1, used for repairing a plurality of said worn blades of said rotary compressor or turbine, wherein said step of removing a worn tip portion is carried out uniformly using the same said standardized height (h) respectively for all of said plurality of worn blades.

24. The method according to claim 23, further comprising a preliminary step of determining said standardized height (h) by inspecting said plurality of worn blades and selecting said standardized height (h) as the maximum height value for which a largest one of said worn tip portions will still be removed in said removing step.

25. The method according to claim 23, wherein said standardized height (h) is a uniform pre-specified height based on empirical information regarding wear characteristics of a general class of blades to which said plurality of worn blades belong, and is not determined based on inspection of said plurality of worn blades.

26. The method according to claim 1, wherein said step of arranging and attaching said repair part is carried out to form a smooth transition between said remaining blade portion and said repair part, and excluding any finish-machining of said smooth transition after said step of arranging and attaching said repair part.

27. The method according to claim 1, further comprising, after said measuring step, a step of determining whether said actual geometry is within an acceptable tolerance range relative to a nominal geometry, and proceeding with said method only if said actual geometry is within said acceptable tolerance range.

* * * * *